US010594950B2

(12) United States Patent
Hasegawa et al.

(10) Patent No.: US 10,594,950 B2
(45) Date of Patent: Mar. 17, 2020

(54) PHOTOGRAPHING APPARATUS

(71) Applicant: Sony Corporation, Tokyo (JP)

(72) Inventors: Yuichi Hasegawa, Tokyo (JP); Noriyuki Yamashita, Tokyo (JP)

(73) Assignee: Sony Corporation (JP)

( * ) Notice: Subject to any disclaimer, the term of this patent is extended or adjusted under 35 U.S.C. 154(b) by 93 days.

(21) Appl. No.: 15/314,730

(22) PCT Filed: Apr. 1, 2015

(86) PCT No.: PCT/JP2015/060394
§ 371 (c)(1),
(2) Date: Nov. 29, 2016

(87) PCT Pub. No.: WO2015/198675
PCT Pub. Date: Dec. 30, 2015

(65) Prior Publication Data
US 2017/0201694 A1    Jul. 13, 2017

(30) Foreign Application Priority Data

Jun. 23, 2014  (JP) .................................. 2014-128020

(51) Int. Cl.
*H04N 5/247*     (2006.01)
*G03B 37/00*     (2006.01)
(Continued)

(52) U.S. Cl.
CPC ............. *H04N 5/247* (2013.01); *G03B 15/00* (2013.01); *G03B 37/00* (2013.01); *H04N 5/225* (2013.01);
(Continued)

(58) Field of Classification Search
CPC ..... H04N 5/247; H04N 5/23238; G03B 37/00
(Continued)

(56) References Cited

U.S. PATENT DOCUMENTS 6,141,034 A  *  10/2000  McCutchen ........... G02B 27/22
                                                348/36
2004/0246333 A1* 12/2004 Steuart, III ............ G03B 35/08
                                                348/36
(Continued)

FOREIGN PATENT DOCUMENTS

JP    2010258669 A    11/2010
JP    2012053896 A     3/2012
(Continued)

OTHER PUBLICATIONS

International Search Report corresponding to PCT/JP2015/060394, dated Jul. 7, 2015 (3 pgs.).

*Primary Examiner* — Thai Q Tran
*Assistant Examiner* — Nienru Yang
(74) *Attorney, Agent, or Firm* — Lerner, David, Littenberg, Krumholz & Mentlik, LLP

(57) ABSTRACT

To provide an excellent photographing apparatus including a plurality of cameras and capable of photographing a wide angle image with less parallax.
View point positions (camera positions) of video cameras 101 to 106 are radially arranged at predetermined angular intervals on a horizontal concentric circle about a vertical reference axis that passes a predetermined reference point. The video cameras are fixed in such a manner that camera principal-axis directions of the video cameras are individually directed outward and upward from a horizontal plane by a predetermined elevation angle $T_{vu}$, with the result that upper end portions of a vertical angle of view overlap. Therefore, photographing can be performed uninterruptedly even in an overhead direction without providing a camera that is directed right above.

9 Claims, 19 Drawing Sheets

(51) Int. Cl.
   *H04N 5/232*  (2006.01)
   *G03B 15/00*  (2006.01)
   *H04N 5/265*  (2006.01)
   *H04N 5/225*  (2006.01)

(52) U.S. Cl.
   CPC ......... *H04N 5/232* (2013.01); *H04N 5/23238* (2013.01); *H04N 5/265* (2013.01)

(58) Field of Classification Search
   USPC .......................................................... 348/38
   See application file for complete search history.

(56) References Cited

U.S. PATENT DOCUMENTS

| | | | |
|---|---|---|---|
| 2008/0309764 A1* | 12/2008 | Kubota | B60R 1/00 348/148 |
| 2009/0066813 A1* | 3/2009 | Shibata | H04N 5/335 348/231.99 |
| 2012/0120069 A1* | 5/2012 | Kodaira | G06F 17/30271 345/419 |
| 2012/0242785 A1 | 9/2012 | Sasagawa et al. | |

FOREIGN PATENT DOCUMENTS

| | | |
|---|---|---|
| JP | 2012204983 A | 10/2012 |
| JP | 2013031060 A | 2/2013 |
| JP | 2013065964 A | 4/2013 |
| JP | 2014099885 A | 5/2014 |

\* cited by examiner

MULTI-CAMERA SYSTEM 100

PHOTOGRAPHING APPARATUS

CROSS-REFERENCE TO RELATED APPLICATIONS

This application is a national phase entry under 35 U.S.C. § 371 of International Application No. PCT/JP2015/060394 filed Apr. 1, 2015, which claims the priority from Japanese Patent Application No. 2014-128020, filed in the Japanese Patent Office on Jun. 23, 2014.

TECHNICAL FIELD

The present invention relates to a photographing apparatus for photographing a wide angle image using a plurality of cameras.

BACKGROUND ART

A camera system for photographing surrounding images using a plurality of cameras has been known. This type of camera system is also called a surrounding camera, an omnidirectional camera, a whole celestial sphere camera, or a half celestial sphere camera.

Images captured by cameras disposed adjacent to each other can be seamlessly joined at a border of the images to generate an image far wider than the fields of view of individual cameras as if the image is captured by a single wide angle camera. In one example, an all-around image similar to an image captured according to an equidistant cylindrical projection method can be obtained by joining the images captured by a plurality of cameras arranged radially with camera principal-axis directions of the cameras directed outward.

SUMMARY OF INVENTION

Technical Problem

It is an object of a technology disclosed in this specification to provide an excellent photographing apparatus capable of photographing a wide angle image using a plurality of cameras.

Solution to Problem

The technology disclosed in this specification has been devised in view of the problem. The technology according to a first aspect thereof is an image capturing apparatus including: a plurality of cameras arranged radially, with a camera principal-axis direction of each camera directed upward from a horizontal plane by a predetermined elevation angle.

According to the technology according to a second aspect of the technology disclosed in this specification, the plurality of cameras of the image capturing apparatus according to the first aspect are arranged at predetermined angular intervals on a horizontal concentric circle about a predetermined reference point.

According to the technology according to a third aspect of the technology disclosed in this specification, the plurality of cameras of the image capturing apparatus according to the first aspect or the second aspect are installed in such a manner that upper end portions of vertical angles of view of the respective cameras overlap each other.

According to the technology according to a fourth aspect of the technology disclosed in this specification, the image capturing apparatus according to the third aspect is configured to control a size of a blind spot under the upper overlapping portions of the vertical angles of view of the respective cameras based on a vertical angle of view $T_v$, an elevation angle $T_{vu}$ of the camera principal-axis direction, and a camera installation position of each of the plurality of cameras.

According to the technology according to a fifth aspect of the technology disclosed in this specification, the plurality of cameras of the image capturing apparatus according to any of the first to fourth aspects are installed in such a manner that right-and-left end portions of image capturing angles of view of cameras disposed adjacent to each other in a horizontal direction overlap each other.

According to the technology according to a sixth aspect of the technology disclosed in this specification, the image capturing apparatus according to the fifth aspect is configured to control a size of a blind spot between horizontal angles of view of adjacent cameras based on a horizontal angle of view $T_h$, an inclination angle $T_{hu}$ of the camera principal-axis direction, and a camera installation position of each of the plurality of cameras.

According to the technology according to a seventh aspect of the technology disclosed in this specification, the image capturing apparatus according to any of the first to sixth aspects further includes: an external device installed in a blind spot region under respective upper overlapping end portions of the image capturing angles of view of the plurality of cameras.

According to the technology according to an eighth aspect of the technology disclosed in this specification, the external device of the image capturing apparatus according to the seventh aspect is at least one of a microphone array, a lighting appliance, a battery, a communication apparatus, and a recording apparatus.

According to the technology according to a ninth aspect of the technology disclosed in this specification, the image capturing apparatus according to any of the first to eighth aspects further includes: a blind spot presenting unit that presents a blind spot under a lower limit of a vertical angle of view of at least one of the plurality of cameras.

According to the technology according to a tenth aspect of the technology disclosed in this specification, the image capturing apparatus according to any of the first to ninth aspects further includes: a blind spot presenting unit that presents a blind spot ahead of front limits of horizontal angles of view of at least two adjacent cameras among the plurality of cameras.

According to the technology according to an eleventh aspect of the technology disclosed in this specification, in the image capturing apparatus according to any of the first to ten aspects, the plurality of cameras are arranged in such a manner that pixels having the same (or near) exposure readout time are arranged adjacent to each other in image capturing devices of adjacent cameras.

According to the technology according to a twelfth aspect of the technology disclosed in this specification, the plurality of cameras of the image capturing apparatus according to any of the first to tenth aspects use image capturing devices of a line-exposure successive readout system. The plurality of cameras are arranged in such a manner that readout directions of image capturing devices of adjacent cameras are opposite to each other and face each other.

According to the technology according to a thirteenth aspect of the technology disclosed in this specification, the plurality of cameras of the image capturing apparatus according to any of the first to tenth aspects use image capturing devices of a line-exposure successive readout system. Cameras rotated clockwise by 90 degrees and cameras rotated anti-clockwise by 90 degrees are arranged alternately.

Advantageous Effects of Invention

According to the technology disclosed in this specification, an excellent photographing apparatus including a plurality of cameras and capable of photographing a wide angle image with less parallax can be provided.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

DESCRIPTION OF EMBODIMENT(S)

An embodiment of a technology disclosed in this specification will be described in detail below by referring to the accompanying drawings.

Figure 1:
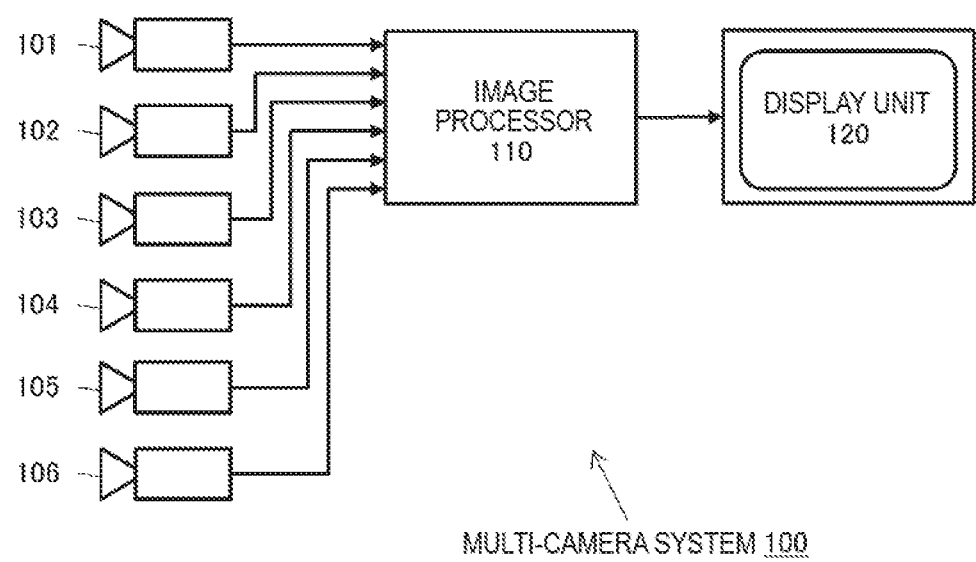
FIG. 1 is a schematic diagram illustrating an example multi-camera system 100 using a technology disclosed in this specification.

FIG. 1 schematically illustrates an example multi-camera system 100 using the technology disclosed in this specification.

Six video cameras 101, 102, . . . , 106 are fixed at respective predetermined positions and output captured images synchronously with an image processor 110. The video cameras 101, 102, . . . , 106 basically include a combination of the same type of products. For example, a complementary metal oxide semiconductor (CMOS) image sensor is used as an image capturing device.

The image processor 110 joins captured images of the video cameras 101, 102, . . . , 106 according to a positional relationship of the video cameras to generate a frame of a wide angle image. The generated wide angle image is displayed, for example, on a display unit 120. The display unit 120 is, for example, a head-mounted display put on a head or a face of an observer of the image, to provide a free viewpoint image in which a view point moves according to the head position (eye direction) of the observer. However, the captured images may not be displayed on the screen. Alternatively, the captured images may be stored in a recording media (not shown), such as a memory card, a hard disc drive (HDD), or a Blu-ray (registered trademark), or may be output externally via an interface, such as a high definition multimedia interface (HDMI, registered trademark), or a mobile high definition link (MHL).

Figure 2:
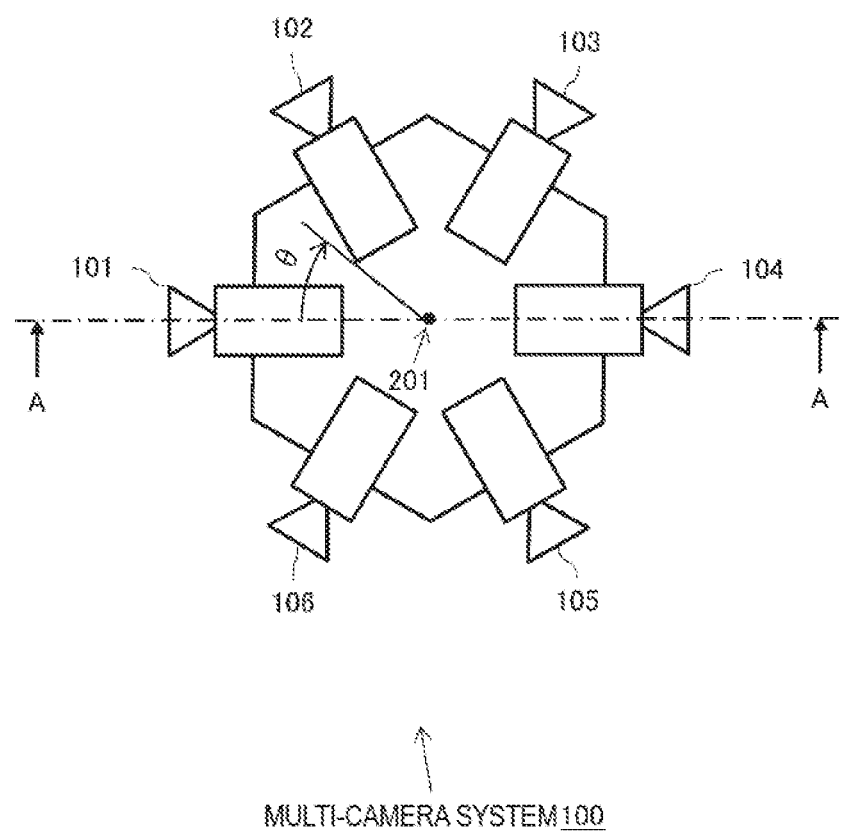
FIG. 2 is a schematic view (top view) illustrating an example arrangement of six video cameras 101, 102, . . . , 106.
Figure 3:
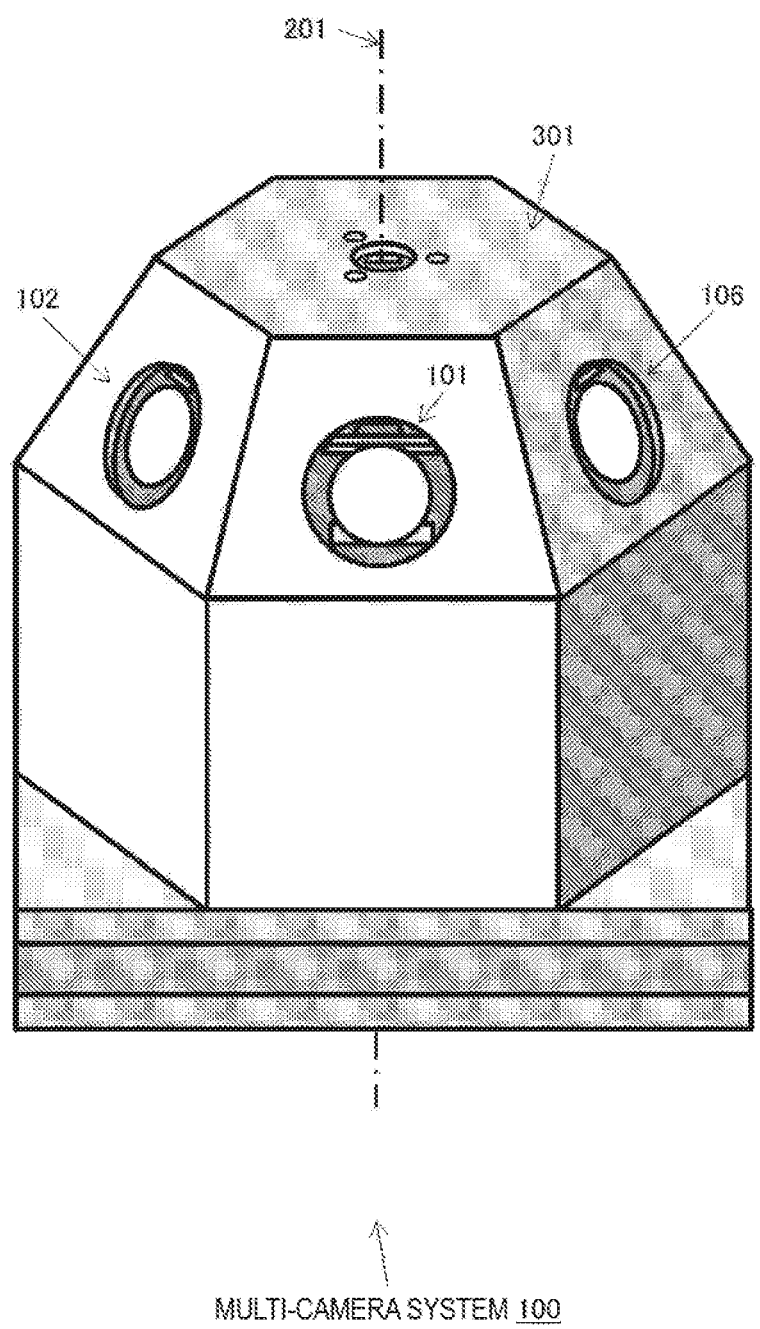
FIG. 3 is a schematic view (perspective view) illustrating an example arrangement of the six video cameras 101, 102, . . . , 106.

FIGS. 2 and 3 schematically illustrate an example arrangement of the six video cameras 101, 102, . . . , 106. FIG. 2 is a top view seen from above, and FIG. 3 is a perspective view seen from the side. As illustrated in the drawings, the six video cameras 101, 102, . . . , 106 are arranged radially, with camera principal-axis directions of the video cameras directed outward.

The video cameras 101, 102, . . . , 106 are arranged more preferably in such a manner that viewpoint positions (camera positions) of the video cameras are arranged radially at predetermined angular intervals on a horizontal concentric circle about a vertical reference axis 201 that passes a predetermined reference point (which is described later) (see FIGS. 2 and 3). When the six video cameras 101 to 106 are used, the video cameras 101 to 106 are arranged on the concentric circle at angular intervals of 60 degrees from each other. Adjacent video cameras, such as the video cameras 101 and 102, are disposed in such a manner that right-and-left end portions of the image capturing angles of view of the video cameras overlap each other to allow photographing of the entire surroundings without interruption in the horizontal direction.

Figure 4:
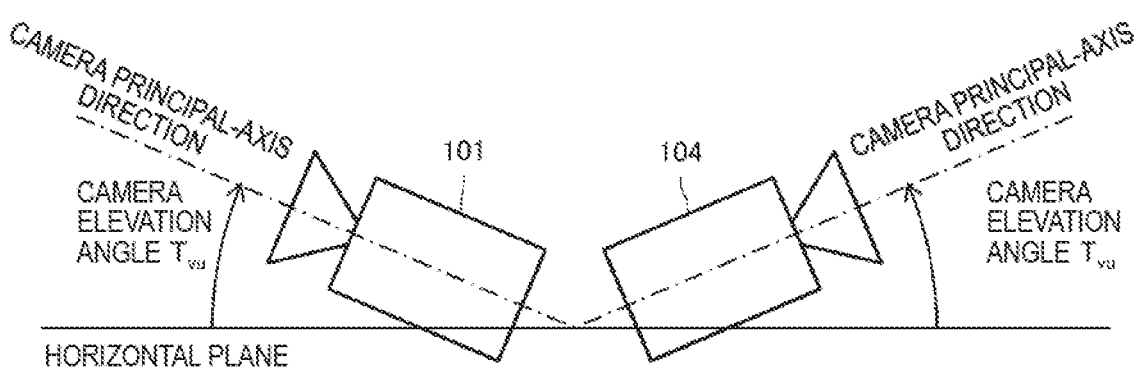
FIG. 4 illustrates postures of a pair of video cameras 101 and 104 with camera principal-axis directions thereof directed opposite to each other.

FIG. 4 is a cross-sectional view cut along line A-A of FIG. 2, illustrating positions of the pair of video cameras 101 and 104 with the principal-axis directions of the video cameras directed opposite to each other. The video cameras 101 and 104 are fixed in such a manner that the camera principal-axis directions of the video cameras directed outward and upward from a horizontal plane by a predetermined elevation angle $T_{vu}$. Other pairs of video cameras 102, 105 and 103, 106 are arranged similarly, although not shown, with the principal-axis directions of each pair of video cameras disposed in opposite directions.

Figure 5:
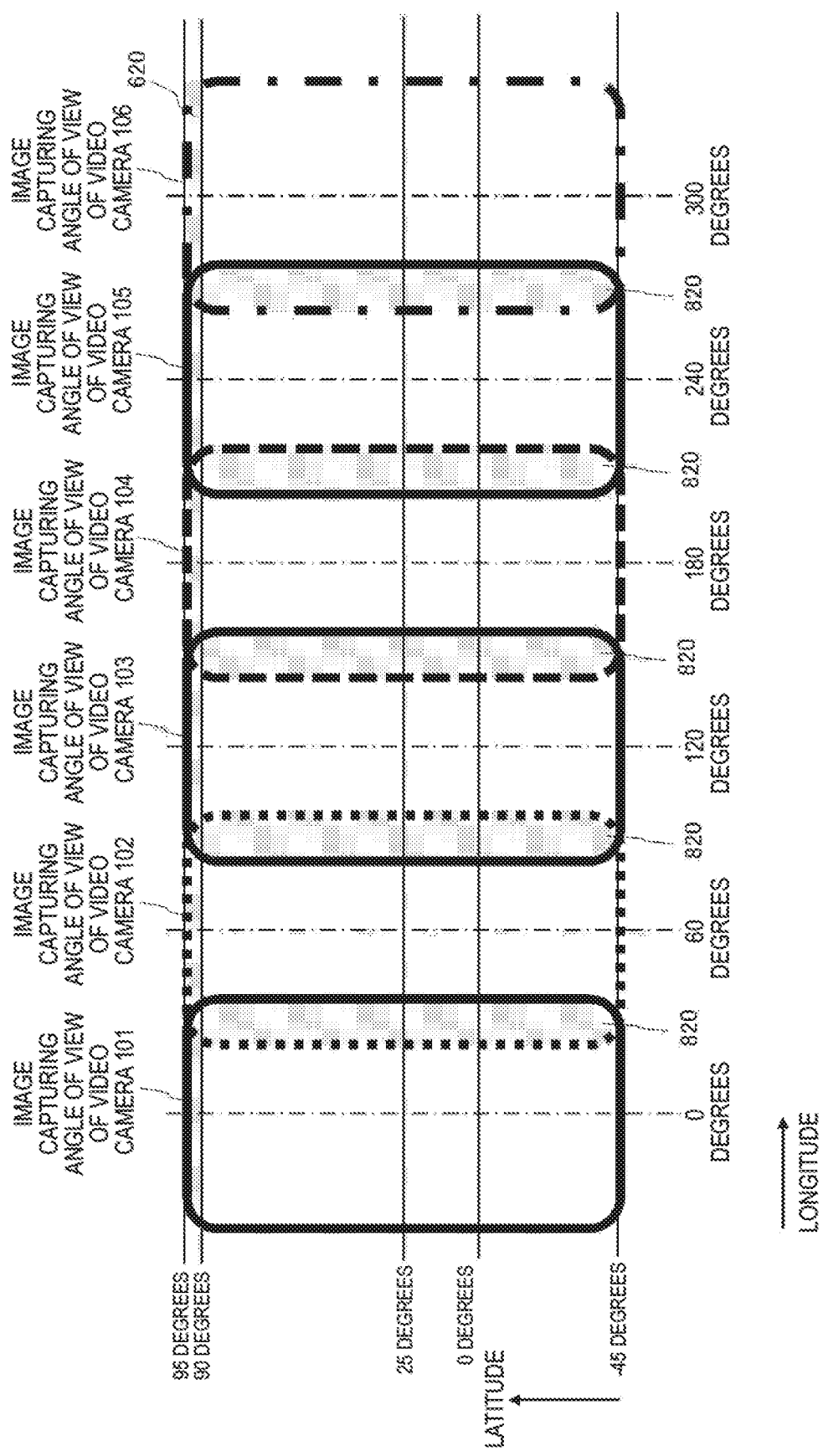
FIG. 5 illustrates image capturing angles of view of the individual video cameras 101, 102, . . . , 106 exploded in a longitude-latitude plane.

The six video cameras 101, 102, . . . , 106 include a combination of the same type of products (as mentioned above). For example, the video cameras 101, 102, . . . , 106 each have 90 degrees by 140 degrees. In other words, the video cameras 101, 102, . . . , 106 each have an angle of view of 90 degrees in the horizontal direction (hereinafter referred to as a "horizontal angle of view") and an angle of view of 140 degrees in the vertical direction (hereinafter referred to as a "vertical angle of view"). FIG. 5 illustrates image capturing angles of view of the video cameras 101, 102, . . . , 106 in an exploded manner in a longitude-latitude plane.

The longitude, as used herein, is a rotation angle θ relative to 0 degrees in the principal-axis direction of the video camera 101, as illustrated in FIG. 2. Other video cameras 102 to 106 are disposed in such a manner that the center (principal-axis direction) of the image capturing angle of view of each video camera is located at the latitude of 60 degrees, 120 degrees, 180 degrees, 240 degrees, and 300 degrees. In the longitudinal or horizontal direction, adjacent video cameras create a right-and-left end-portions overlapping region 820 where end portions of the horizontal angle of view overlap each other. The multi-camera system 100 is therefore able to photograph the entire surroundings without interruption in the horizontal direction.

Meanwhile, when the video cameras 101, 102, . . . , 106 are fixed with the camera principal-axis directions of the video cameras directed upward from the horizontal plane by the elevation angle $T_{vu}=25$ degrees (see FIG. 4), the center of the vertical angle of view of each video camera has an offset of 25 degrees upward from the horizontal plane, i.e., the latitude of 0 degrees, such that a photographing angle of view in the latitudinal direction is 140 degrees from the latitude of −45 degrees to 95 degrees, as illustrated in FIG. 5. Thus, the multi-camera system 100 can obtain the image capturing angle of view of 360 degrees by 140 degrees by using the radially-arranged six video cameras 101 to 106.

Since the photographing angle of view of the video cameras 101, 102, . . . , 106 exceeds 90 degrees in the latitudinal direction, the image capturing angle of view can extend up to 5 degrees backward from right above. The pair of video cameras 101, 104, in which the camera principal-axis directions of the video cameras are disposed in opposite directions, creates an upper-end-portion overlapping region 620 where upper end portions of the vertical angle of view of overlap each other. The multi-camera system 100 can, therefore, photograph images without interruption in the overhead direction without providing the camera that is directed right above.

Lower end portions of the vertical angles of view of the pair of video cameras 101, 104, in which the camera principal-axis directions of the video cameras are disposed in opposite directions, are apart from each other, and a blind spot region is created under the latitude of −45 degrees. The multi-camera system 100 may therefore be regarded as a half-celestial sphere camera.

The longitudinal image capturing angle of view of 90 degrees by 140 degrees is achieved by rotating a typical video camera product having a horizontally-long image capturing angle of view by 90 degrees in clockwise or anti-clockwise about the camera principal-axis.

The image capturing angle of view of the multi-camera system 100 is described more in detail.

Figure 6:
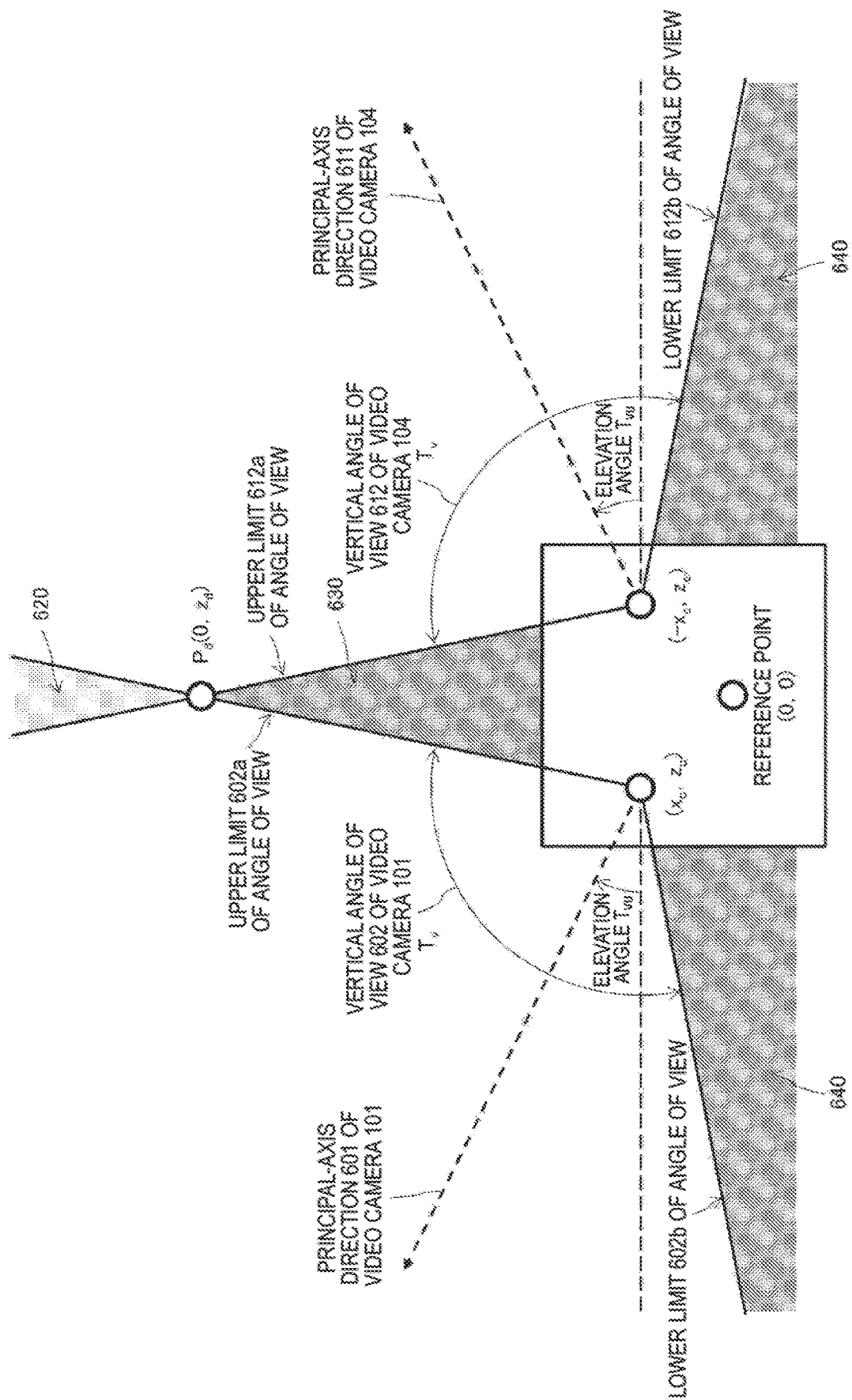
FIG. 6 illustrates the image capturing angles of view of the pair of video cameras 101 and 104 in an up and down direction (vertical direction) with the camera principal-axis directions thereof directed opposite to each other when the multi-camera system 100 is seen from the side.

FIG. 6 illustrates the vertical angle of view of the pair of video cameras 101 and 104 with the camera principal-axis directions of the video cameras disposed in opposite directions when the multi-camera system 100 is seen from the side. Other pairs of video cameras 102, 105 and 103, 106 are arranged similarly, although not shown, with the principal-axis directions of each pair of video cameras disposed in opposite directions.

A camera position (view point position) of the video camera 101 is located at a point $(x_c, z_c)$ relative to a reference point (0, 0), and the camera principal-axis direction of the video camera 101 is fixed at the elevation angle $T_{vu}=25$ degrees upward from the horizontal plane, as indicated by a reference number 601. The video camera 101 has a vertical angle of view of 140 degrees, as indicated by a reference number 602.

The camera position (view point position) of the video camera 104 is located at point $(-x_c, z_c)$ relative to the reference point (0, 0), as indicated by a reference number 611, and the camera principal-axis direction of the video camera 104 is fixed at the elevation angle $T_{vu}=25$ degrees upward from the horizontal plane. The video camera 104 has a vertical angle of view of 140 degrees, as indicated by a reference number 612.

The vertical angles of view 602 and 612 of the video cameras 101 and 104, respectively, can extend up to 5 degrees backward from right above, causing upper limits 602*u* and 612*u* of the angles of view to cross each other at point $P_d$ (0, $z_d$). Accordingly, the upper-end-portion overlapping region 620 where the upper end portions of the vertical angles of view 602 and 612 overlap each other is created, allowing photographing in the overhead direction without interruption even when both the video camera 101 and 104 are not directed upward.

Figure 19:
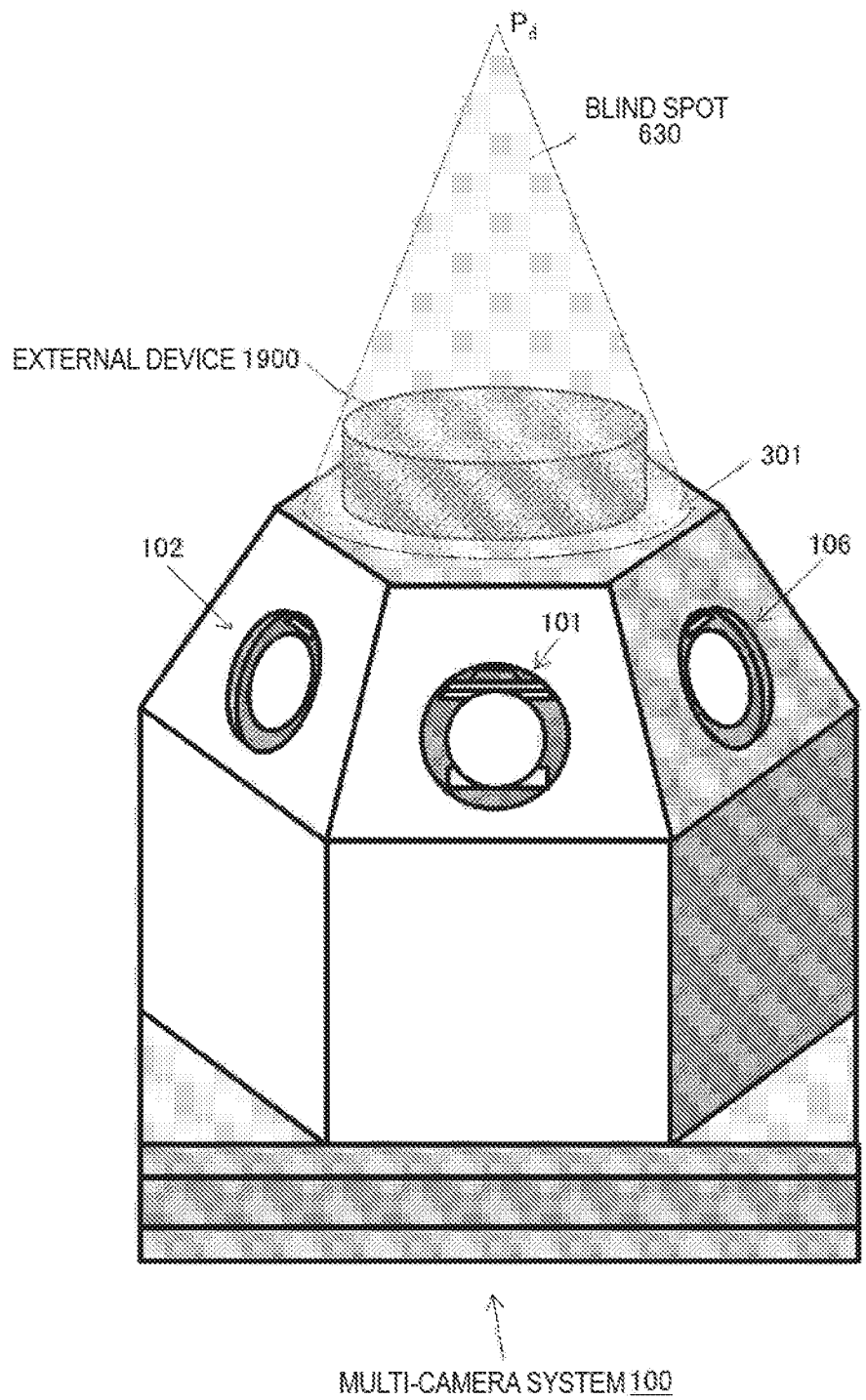
FIG. 19 illustrates the multi-camera system 100 with an external device 1900 disposed on a top board thereof.

Meanwhile, a blind spot region 630 that is not included in either the vertical angle of view 602 or 612 of the video cameras 101, 104 is created under the point $P_d$. The point $P_d$ is the upper limit point of the field of view region 630. Photographing is not allowed by either the video camera 101 or 104 in the blind spot region 630, but an external device 1900, such as an accessory part, can be installed (see FIG. 19) in the blind spot region 630 on a top board 301 of the multi-camera system 100 under the point $P_d$ (see FIG. 3) on the condition that such an external device does not interrupt the field of view of the video cameras 101, 104. Examples of such an external device 1900 include a microphone array, a lighting appliance, a battery, a communication device, or a recording device (e.g., a hard disk drive). For example, the microphone array may be installed on the top board 301 to allow sound collection in the vicinity of the viewpoints of the video cameras 101 to 106, which is advantageous in facilitating localization of sound images.

A lower limit 602*b* of the vertical angle of view 602 of the video camera 101 is apart from a lower limit 612*b* of the vertical angle of view 612 of the video camera 104, and do not cross each other. Thus, as described above by referring to FIG. 5, a blind spot region 640 where photographing is not allowed by either the video camera 101 or 104 is created between the lower limit 602B of the vertical angle of view 602 of the video camera 101 and the lower limit 612B of the vertical angle 612 of the video camera 104.

When a photographer photographs an image of an object (e.g., an object placed on the floor) that is set lower than the installation plane of the video cameras 101 to 106 using the multi-camera system 100, the photographer should pay enough attention to put the object in the image capturing angle of view (or exclude any part of the object from the blind spot 640). The multi-camera system 100 may further include a blind spot presenting unit that visually presents the lower limit of the vertical angle of view by, for example, a laser pointer (which is described later).

The size of the blind spot region 630 (a distance $z_d$ from the reference point to the point $P_d$) on the top board 301 of the multi-camera system 100 is controllable according to the vertical angle $T_v$, the elevation angle $T_{vu}$ of the camera principal-axis direction, and the installation position $(x_c, z_c)$ relative to the reference point (0, 0) of the video cameras 101 to 106. A control method of the size of the blind spot region 630 above the video cameras 101, 104 is described below by referring to FIG. 7.

Figure 7:
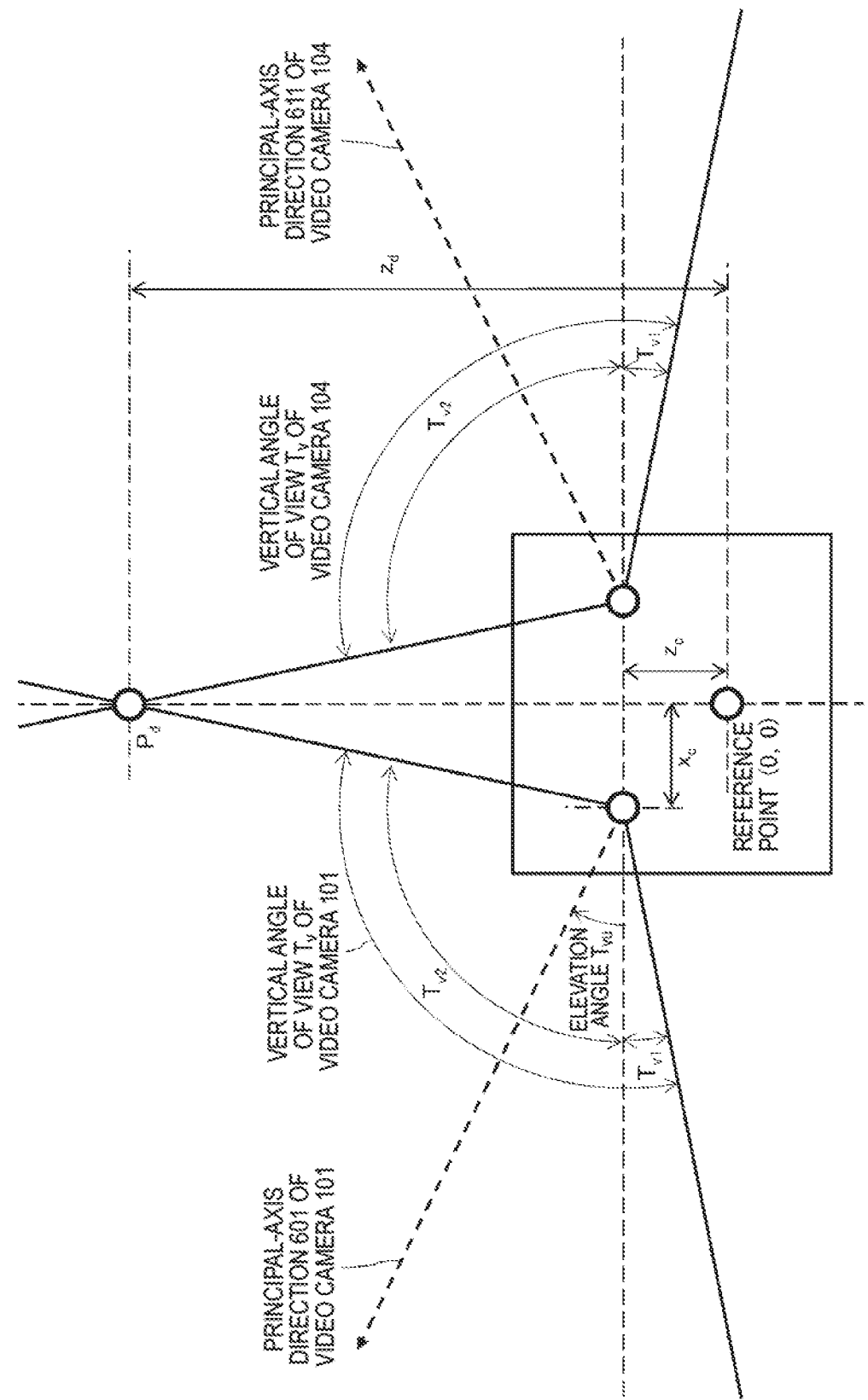
FIG. 7 is an illustration for explaining how to control the size of a blind spot region 630 located above the video cameras 101, 104.

FIG. 7 illustrates the vertical angle of view $T_v$ of the video cameras 101, 104, the elevation angle $T_{vu}$ of the camera principal-axis directions of the video cameras 101, 104, a lower part of the vertical angle of view $T_{v1}$ below than the horizon of the video cameras 101, 104, an upper part of the vertical angle of view $T_{v2}$ above the horizon of the video cameras 101, 104, a height $z_c$ from the reference point (0, 0) to the installation positions of the video cameras 101, 104, and a distance $x_c$ from the reference axis to the installation positions of the video cameras 101, 104. The distance from the reference point (0, 0) to the point $P_d$, i.e., the upper limit distance $z_d$ of the blind spot is controllable based on the elevation angle $T_{vu}$ of the camera principal-axis direction and the camera installation position $(x_c, z_c)$ relative to the reference point according to Formula (1):

[Math. 1]

$$z_d = x_c \times |\tan(180° - T_{v2}) + z_c| \quad (1)$$

where $T_{v2} = T_v/2 + T_{vu}$

Assuming that the vertical angle of view of the video cameras 101, 104 is $T_v$=139 degrees, the elevation angle of the camera principal-axis direction of the video cameras 101, 104 is $T_{vu}$=25 degrees, and the installation position of the video camera 101 is $(x_c, z_c)$=(40 mm, 83 mm) (the installation position of the video camera 104 is located symmetrically at $(x_c, z_c)$ relative to the reference axis), the upper limit distance $z_d$ of the blind spot is determined according to Formula (2):

[Math 2]

$$\begin{aligned} z_d &= x_c \times |\tan(180° - T_{v2})| + z_c \\ &= 40 \text{ mm} \times |\tan(180° - (139°/2 + 25°))| + 83 \text{ mm} \\ &= 591.25 \text{ mm} \end{aligned} \quad (2)$$

To decrease the blind spot 630, the elevation angle is increased to $T_{vu}$=35 degrees, while the vertical angle $T_v$ of the video cameras 101, 104 and the installation position $(x_c, z_c)$ of the video camera 101 are fixed as above, so that the upper limit distance $z_d$ of the blind spot approaches the reference point (top board 301) according to Formula (3):

[Math 3]

$$\begin{aligned} z_d &= x_c \times |\tan(180° - T_{v2})| + z_c \\ &= 40 \text{ mm} \times |\tan(180° - (139°/2 + 35°))| + 83 \text{ mm} \\ &= 237.67 \text{ mm} \end{aligned} \quad (3)$$

Figure 8:
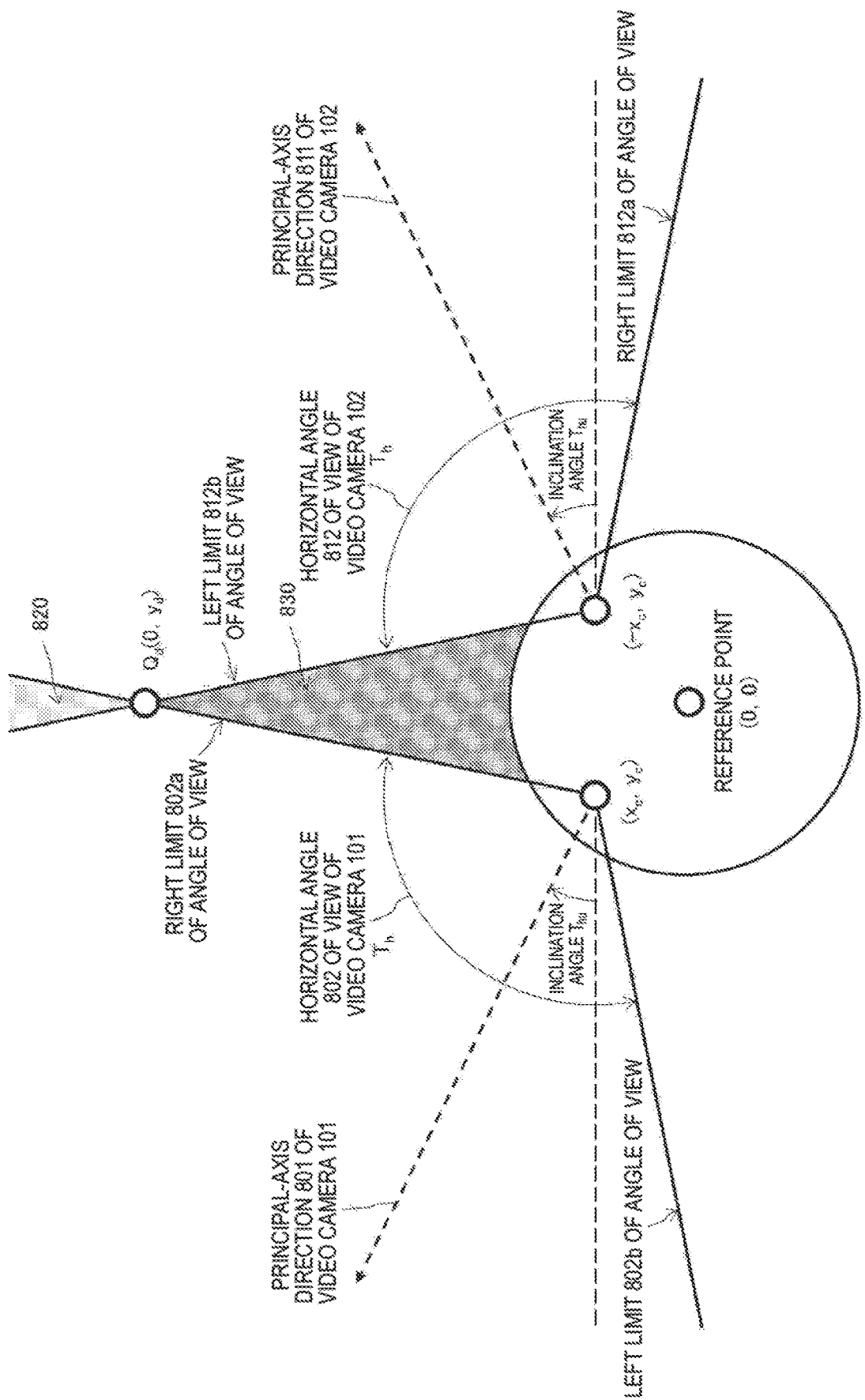
FIG. 8 illustrates horizontal angles of view of the video camera 101 and the video camera 102 arranged adjacent to each other, when the multi-camera system 100 is viewed from above.

FIG. 8 illustrates the horizontal angles of view of the video cameras 101 and 102 that are arranged laterally adjacent to each other, when the multi-camera system 100 is seen from above. Any combinations of two video cameras arranged laterally adjacent to each other may be disposed similarly, although such combinations are not shown.

The camera position (view point position) of the video camera 101 is located at the point $(x_c, y_c)$ relative to the reference point (0, 0). The video camera 101 has the horizontal angle of view $T_h$, as indicated by a reference number 802, and the camera principal-axis direction is inclined, as indicated by a reference number 801, from the x-axis by an inclination angle $T_{hu}$.

The camera position (view point position) of the video camera 102 is located at the point $(-x_c, y_c)$ relative to the reference point (0, 0). The video camera 104 has the horizontal angle of view $T_h$, as indicated by a reference number 812, and the camera principal-axis direction is inclined, as indicated by a reference number 811, from the x-axis by the inclination angle $T_{hu}$.

The horizontal angle of view 802 of the video camera 101 is a region between a right limit 802a of the angle of view and a left limit 802b of the angle of view. The horizontal angle of view 812 of the video camera 102 is a region between a right limit 812a of the angle of view and a left limit 812b of the angle of view. The right limit 802a of the horizontal angle of view 802 of the video camera 101 crosses the left limit 812b of the horizontal angle of view 812 of the video camera 104 at the point $Q_d$ (0, $y_d$), which is the point of $y_d$, located ahead of the reference point (0, 0). Accordingly, the overlapping region 820 where the right portion of the horizontal angle of view 802 and left portion of the horizontal angle of view 812 overlap each other is formed ahead of the point $Q_d$, allowing photographing of the scene between the principal-axis directions 801, 802 of the video cameras 101, 102, respectively, without interruption. The entire multi-camera system 100 can therefore photograph the image of the entire surroundings about the reference point (0, 0) without interruption.

Meanwhile, a blind spot region 830 which is not included either in the horizontal angle of view 802 or 812 of the video cameras 101, 102 is created before the point $Q_d$. The point $Q_d$ may therefore be regarded as a front limit of the angle of view between the horizontal angles of view 802, 812. When the photographer photographs an image of an object (e.g., an object placed on the floor) that is set approximately in the center between the camera principal-axis directions of the video cameras 101, 102 using the multi-camera system 100, the photographer should pay enough attention to put the object in the image capturing angle of view (or exclude any part of the object from the blind spot 830). The multi-camera system 100 may further include a blind spot presenting unit that visually presents the front limit of the vertical angle of view between the horizontal angles of view 802, 812 by, for example, a laser pointer (which is described later).

The size of the front blind spot region 830 (a distance $y_d$ from the reference point to the point $Q_d$) of the multi-camera system 100 is controllable based on the horizontal angle $T_h$, the inclination angle $T_{hu}$ of the camera principal-axis direction, and the installation position $(x_c, y_c)$ relative to the reference point (0, 0) of the video cameras 101 to 106. A control method of the size (the position of the front limit of the angle of view at the point $Q_d$) of the blind spot region 830 between the horizontal angles of view 802, 812 of the video cameras 101, 102 is described below by referring to FIG. 9.

Figure 9:
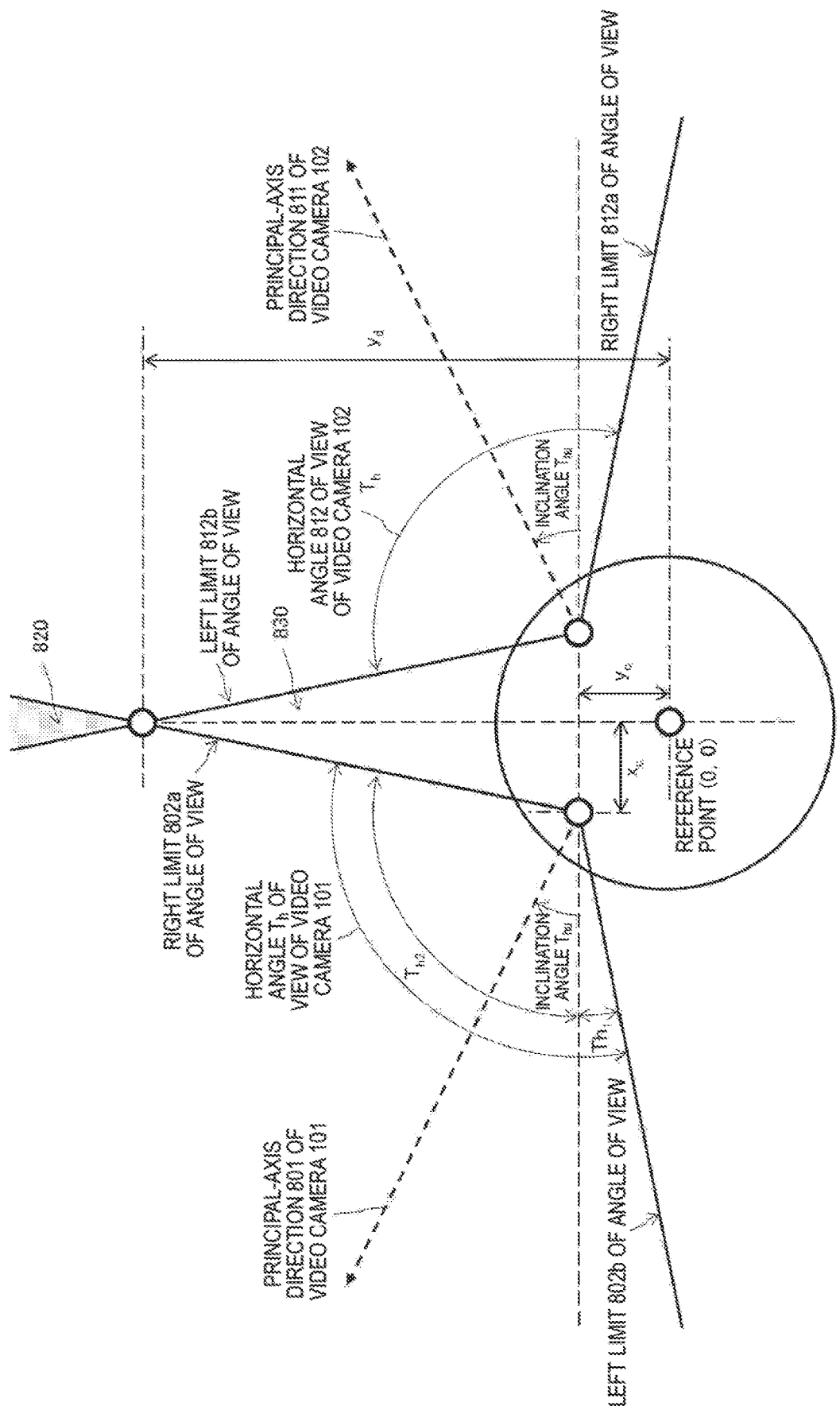
FIG. 9 is an illustration for explaining how to control the size of a blind spot region 830 between the image capturing angles of view of the adjacent video cameras 101, 102.

FIG. 9 illustrates the horizontal angle of view $T_h$ of the video cameras 101, 102, the elevation angle $T_{hu}$ of the camera principal-axis directions of the video cameras 101, 102, a rear part of the horizontal angle of view $T_{h1}$ behind the x-axis of the video cameras 101, 102, a front part of the horizontal angle of view $T_{h2}$ ahead of the x-axis of the video cameras 101, 102, a distance $y_c$ from the reference point (0, 0) to the installation positions of the video cameras 101, 102, and a distance $x_c$ from the reference point to the installation positions of the video cameras 101, 102. The distance from the reference point (0, 0) to the front limit of the angle of view, $q_d$, i.e., the front limit distance $y_d$ of the blind spot, is controllable based on the inclination angle $T_{hu}$ of the camera principal-axis direction and the camera installation position $(x_c, y_c)$ relative to the reference point according to Formula (4):

[Math. 4]

$$y_d = x_c \times |\tan(180° - T_{h2})| + y_c \qquad (4)$$

where $T_{h2} = T_h/2 + T_{hu}$

When the multi-camera system 100 uses the video cameras having the horizontal angle of view $T_h$=75 degrees, the entire surroundings, i.e., 360 degrees, can be covered by at least five video cameras, as 75 degrees×5 video cameras=375 degrees. To sufficiently increase the right-and-left end-portions overlapping region 820, six video cameras may be used at the inclination angle $T_{hu}$=60 degrees. When the video cameras are installed each at the camera installation position $(x_c, y_c)$=(20 mm, 35 mm), the front limit distance $y_d$ of the blind spot is determined according to the Formula (5):

[Math 5]

$$\begin{aligned} y_d &= x_c \times |\tan(180° - T_{k2})| + y_c \qquad (5) \\ &= 20 \text{ mm} \times |\tan(180° - (75°/2 + 60°))| + 35 \text{ mm} \\ &= 186.92 \text{ mm} \end{aligned}$$

To decrease the front limit distance $y_d$ of the blind spot, the distance $x_c$ or $y_c$, which is the distance between the reference point and the camera installation position, is decreased.

The camera installation positions $(x_c, y_c, z_c)$, the elevation angle $T_{vu}$, and the inclination angle $T_{hu}$ of the video cameras 101 to 106 may be fixed, or these parameters can alternatively be changed by installing the video cameras 101 to 106 on a driving table (not shown).

It should be fully understood that, according to the multi-camera system 100 of the present embodiment, photographing of the entire surroundings (half-celestial sphere) can be performed with a small number of video cameras.

Next, parallax generated in joining captured images captured by the video cameras 101 to 106 is described.

The video cameras 101 to 106 mounted on the multi-camera system 100 typically include a combination of the same type of products. Such products may, for example, use a CMOS image sensor as the image capturing device.

A charge coupled device (CCD) image sensor is also known as the image capturing device other than the CMOS image sensor. The CMOS image sensor has a simple circuit structure and low power consumption.

Figure 10:
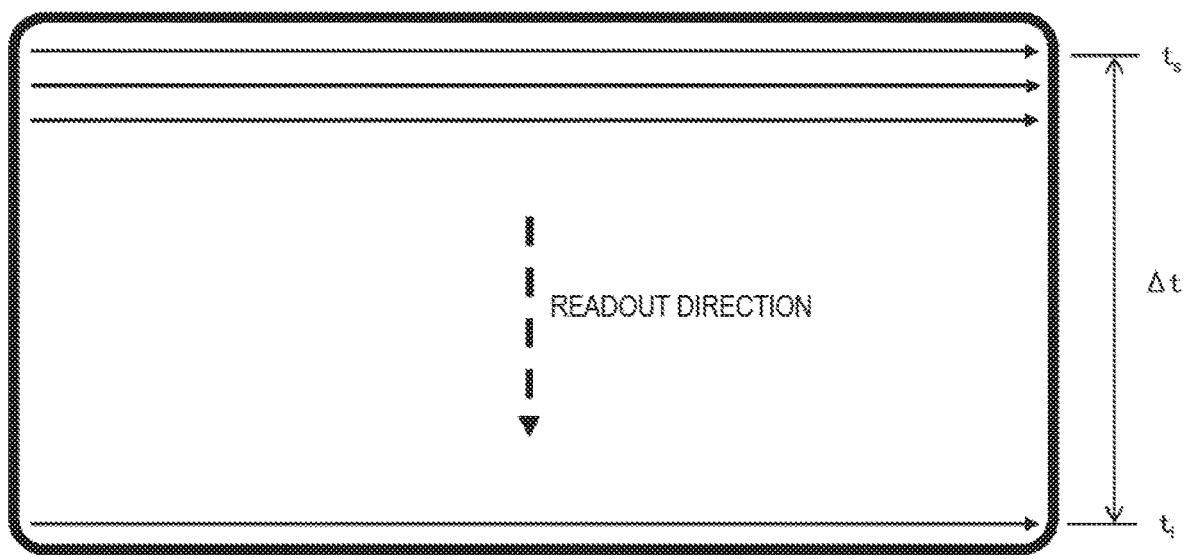
FIG. 10 is an illustration for explaining time delay in readout time of exposure generated on the screen of line an exposure successive readout system.

The CCD sensor uses a so-called global shutter system in which all pixels are simultaneously exposed and collectively read out, enabling simultaneous exposure of the entire screen. In contrast, the CMOS sensor typically uses a so-called rolling shutter system in which each line is exposed and successively read out (see, e.g., Patent Literature 3), disabling the simultaneous exposure of the entire screen. In the rolling shutter system, exposure typically proceeds for each line from the top to the bottom of the screen, which results in generating time delay Δt between start time $t_s$ at which the exposure and readout of the top line starts and end time $t_1$ at which the exposure and readout of the bottom line ends (see FIG. 10), and causing parallax.

Figure 11:
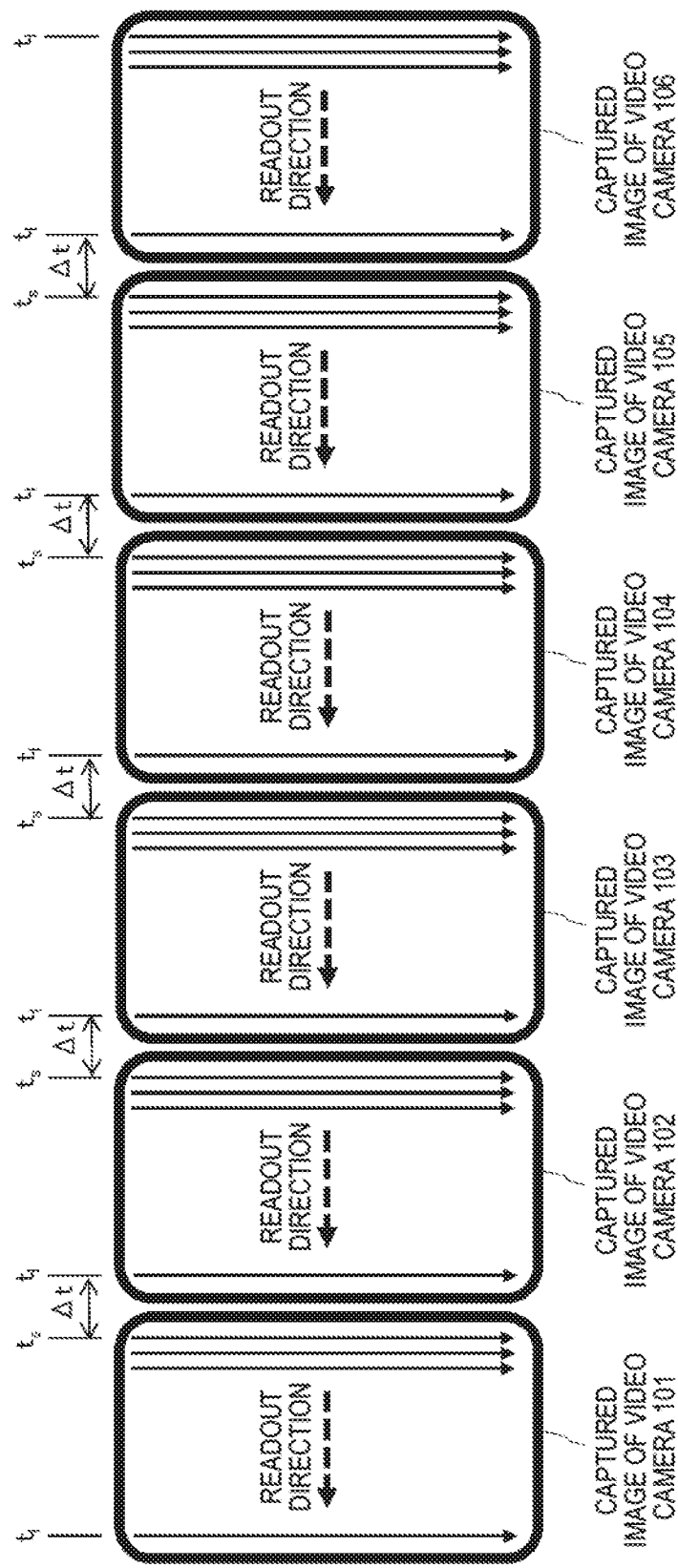
FIG. 11 illustrates time delay in exposure readout time between adjacent image capturing devices when a plurality of video cameras is arranged by rotating all the video cameras clockwise or anti-clockwise by 90 degrees.

The multi-camera system 100 according to the present embodiment includes the six video cameras 101 to 106 arranged radially, with each video camera having a horizontally-long image capturing angle of view and rotated by 90 degrees (as mentioned above). When all of the six video cameras 101 to 106 are rotated by 90 degrees clockwise or anti-clockwise, adjacent image capturing devices provide pixel data in which each exposure and readout time is different by time delay Δt, as illustrated in FIG. 11, causing parallax at borders of the image capturing devices. To simplify the description herein, the right-and-left end-portions overlapping region between adjacent video cameras are not considered.

Figure 12:
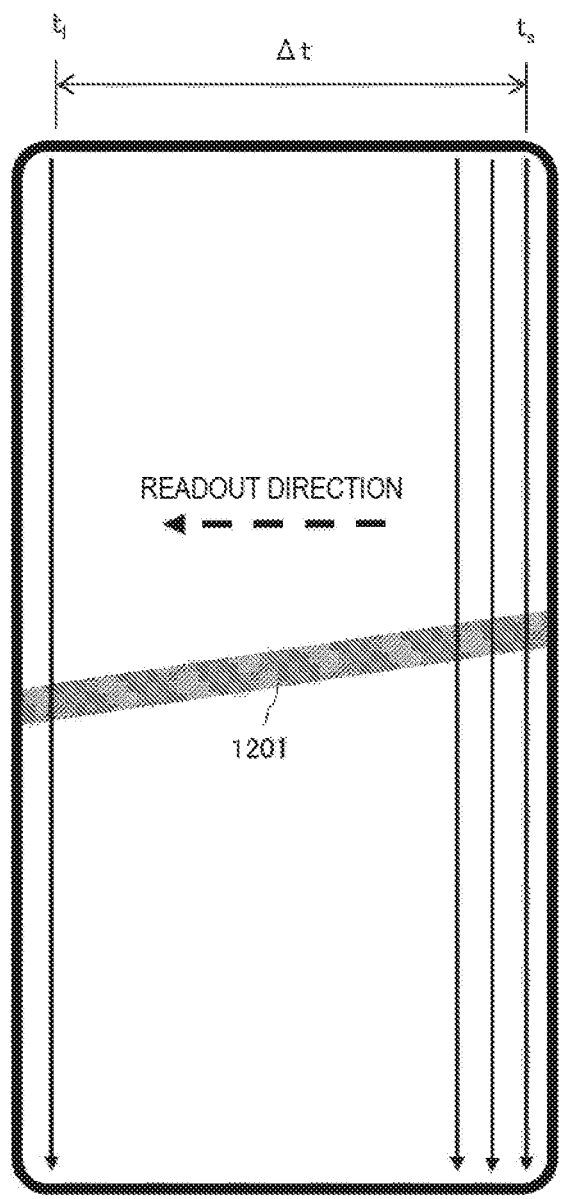
FIG. 12 illustrates an image photographed by rotating the image capturing device of the line-exposure successive readout system clockwise by 90 degrees.
Figure 13:
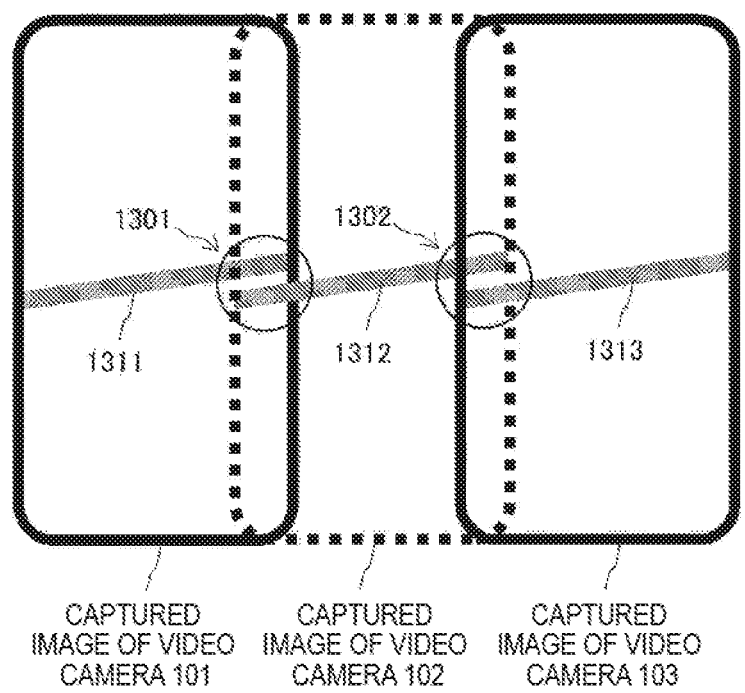
FIG. 13 illustrates parallax generated between adjacent captured images in the video camera arrangement illustrated in FIG. 11.

FIG. 12 illustrates an image photographed by the image capturing device in the line exposure successive readout system by rotating the image capturing device clockwise by 90 degrees. An object that falls at a constant speed is photographed, and a resulting object image inclines downward to the right, as indicated by a reference number 1201, because the image is captured at lower positions due to a difference in exposure readout time for each line. Since the right-and-left end-portions overlapping region where the end portions of the horizontal angles of view overlap each other is formed between the adjacent video cameras (see, e.g., FIG. 2), the surrounding images are photographed by the video cameras arranged radially as illustrated in FIG. 13. The object images photographed by the video cameras 101, 102, and 103 are indicated by reference numbers 1311, 1312, and 1313, respectively. At the right-and-left end-portions overlapping regions indicated by the reference numbers 1301 and 1302 of the captured images captured by adjacent video cameras 101, 102, and 103, the parallax occurs such that the object is reflected double as the objects 1311 and 1312 and the objects 1312 and 1313. The parallax becomes more remarkable as the object moves faster.

To solve such a problem of parallax, the video cameras 101 to 106 are arranged so that the pixels having the same (or near) exposure readout time can be arranged adjacent to each other in the image capturing devices of adjacent video cameras.

Figure 14:
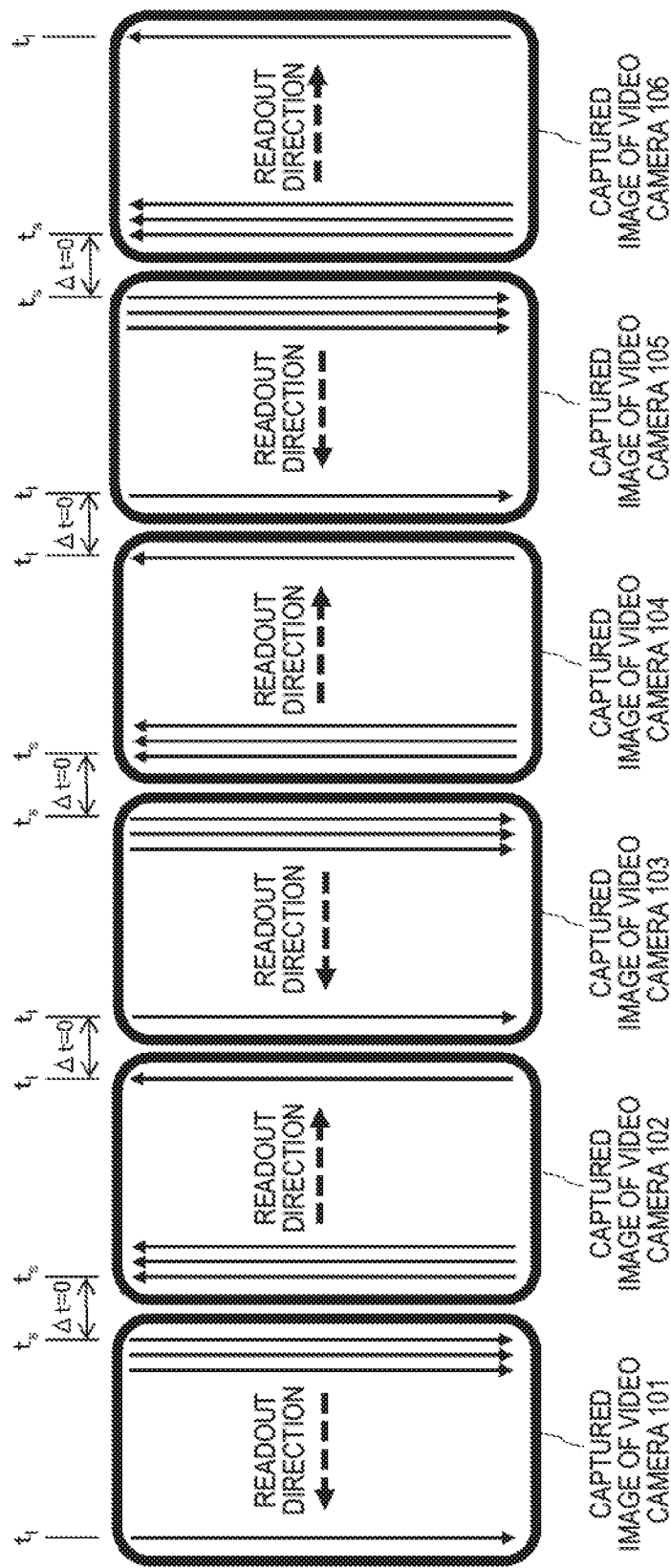
FIG. 14 illustrates time delay in exposure readout time between adjacent image capturing devices when the video cameras rotated clockwise by 90 degrees and the video cameras rotated anti-clockwise by 90 degrees are arranged alternately.

Specifically, as illustrated in FIG. 14, the video cameras rotated clockwise by 90 degrees and the video cameras rotated anti-clockwise by 90 degrees are arranged alternately. Since the video cameras rotated clockwise by 90 degrees and the video cameras rotated anti-clockwise by 90 degrees are arranged side by side, the readout directions of the image capturing devices of the adjacent video cameras are opposite to each other and faces each other. As a result of this arrangement, the exposure readout start lines at readout time $t_s$ or the exposure readout end lines at readout time $t_1$ (=$t_s$+Δt) are always located side by side, thereby eliminating substantially all parallax generated at the borders of the image capturing devices. To simplify the description, the right-and-left end-portions overlapping regions of the adjacent video cameras are not considered.

Figure 15:
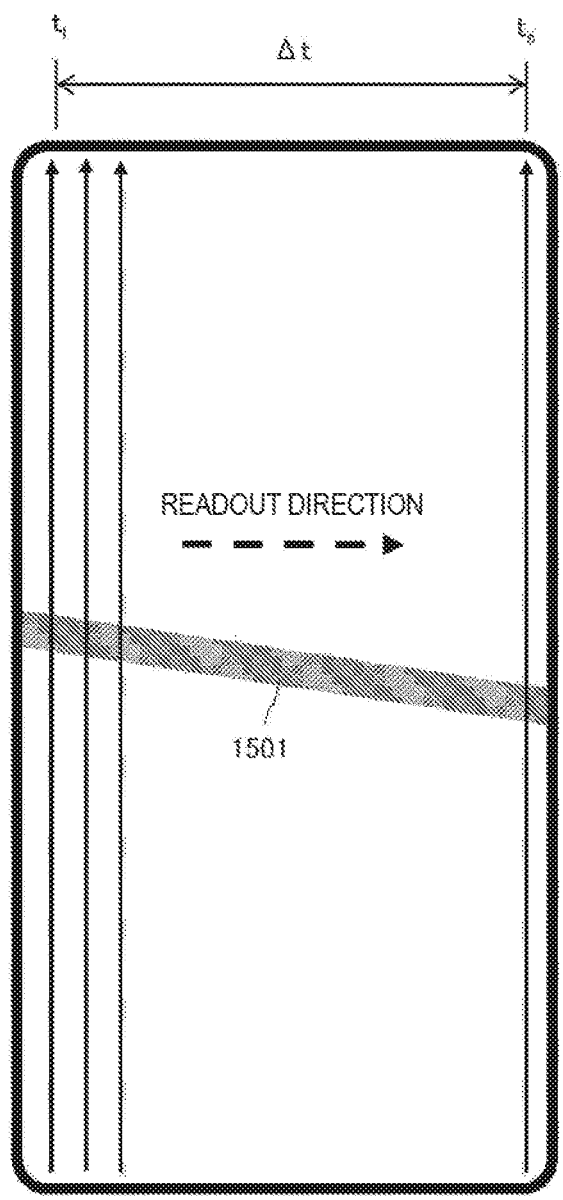
FIG. 15 illustrates an image photographed by rotating the image capturing device of the line-exposure successive readout system anti-clockwise by 90 degrees.

FIG. 15 illustrates an example image photographed by the image capturing device in the line-exposure successive readout system by rotating the image capturing device anti-clockwise by 90 degrees from the position of FIG. 12. The object is photographed while falling at a fixed speed and the image of the object is captured at lower pixels according to the difference in readout time for each line. In contrast to the example illustrated in FIG. 12, the resulting image of the object inclines upward to the right as indicated by a reference number 1501.

Figure 16:
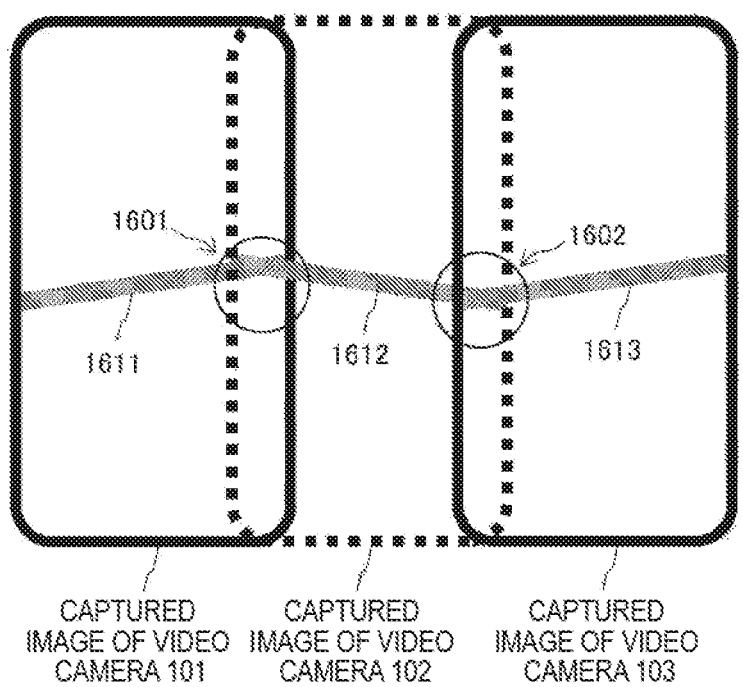
FIG. 16 illustrates parallax generated between adjacent captured images in the video camera arrangement illustrated in FIG. 14.

The right-and-left end-portions overlapping regions where the end portions of the horizontal angles of view of the adjacent video cameras overlap each other are formed (see, e.g., FIG. 2), and the surrounding images are photographed by the video cameras arranged radially and rotated clockwise and anti-clockwise alternately by 90 degrees as illustrated in FIG. 16. The object images captured by the video cameras 101, 102, and 103 are indicated by reference numbers 1611, 1612, and 1613, respectively. The objects 1611 and 1612 and the objects 1612 and 1613 substantially overlap each other, as indicated by reference numbers 1601 and 1602, at the right-and-left end-portions overlapping regions of the captured images captured by the adjacent video cameras 101, 102, and 103. Thus, the pallalax is prevented.

Next, a field-of-view presenting function of the multi-camera system 100 is described.

As described above by referring to FIGS. 2 and 6, the multi-camera system 100 according to the present embodiment is able to photograph images uninterruptedly in the overhead direction without providing the video camera directed upward. At the same time, the blind spot regions are formed at the feet of the video cameras due to the lower limit of the vertical angle of view of the video cameras 101 . . . .

When the photographer photographs the image of an object (e.g., an object placed on the floor) that is set lower than the installation plane of the video cameras 101 to 106 by using the multi-camera system 100, the photographer should pay enough attention to put the object in the image capturing angle of view (or exclude any part of the object from the blind spot). The multi-camera system 100 may further include a blind spot presenting unit that visually presents a place on the floor as the lower limit of the vertical angle of view by, for example, a laser pointer (which is described later).

Figure 17:
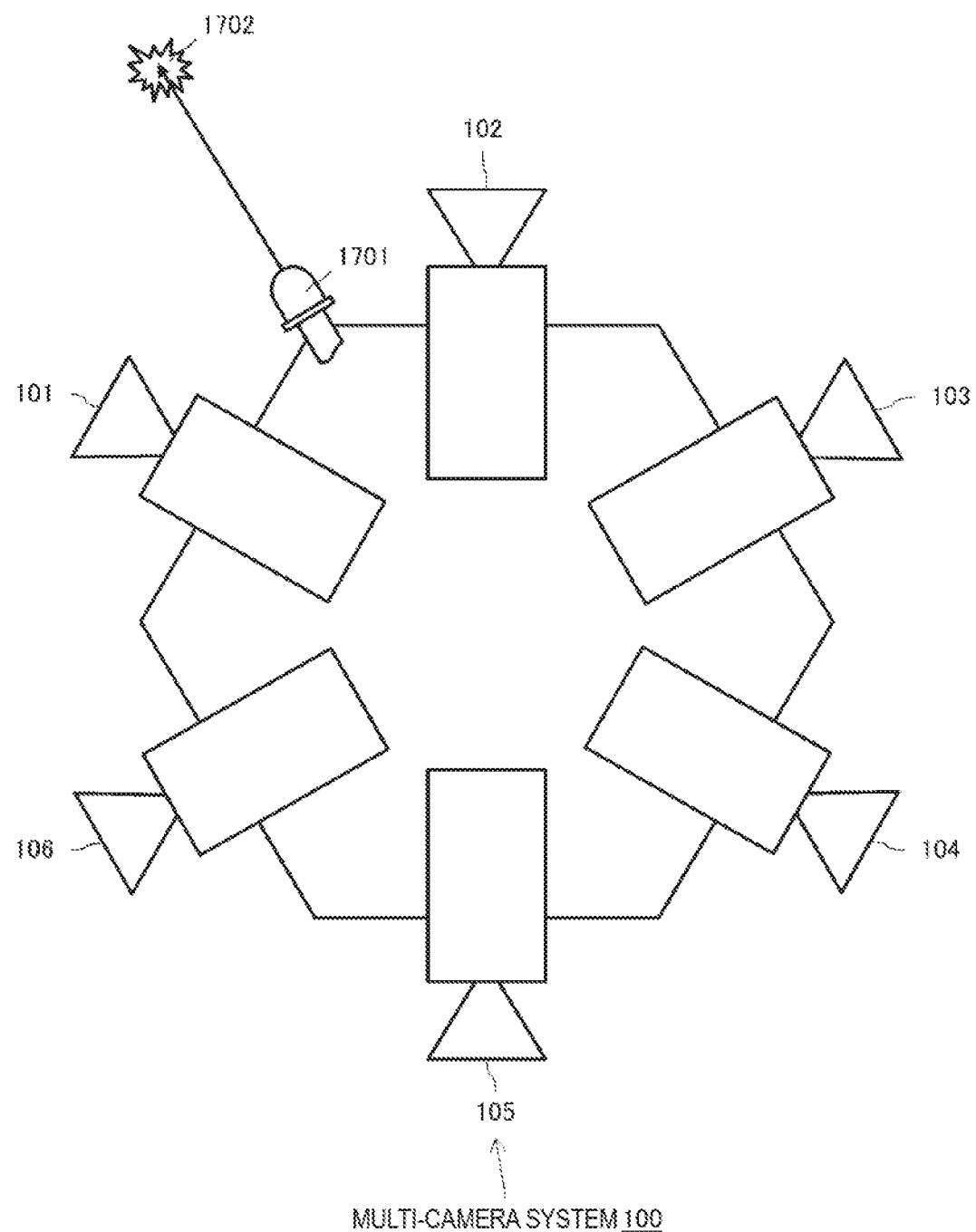
FIG. 17 illustrates an example arrangement of a laser pointer 1701 used as a blind spot presenting portion.
Figure 18:
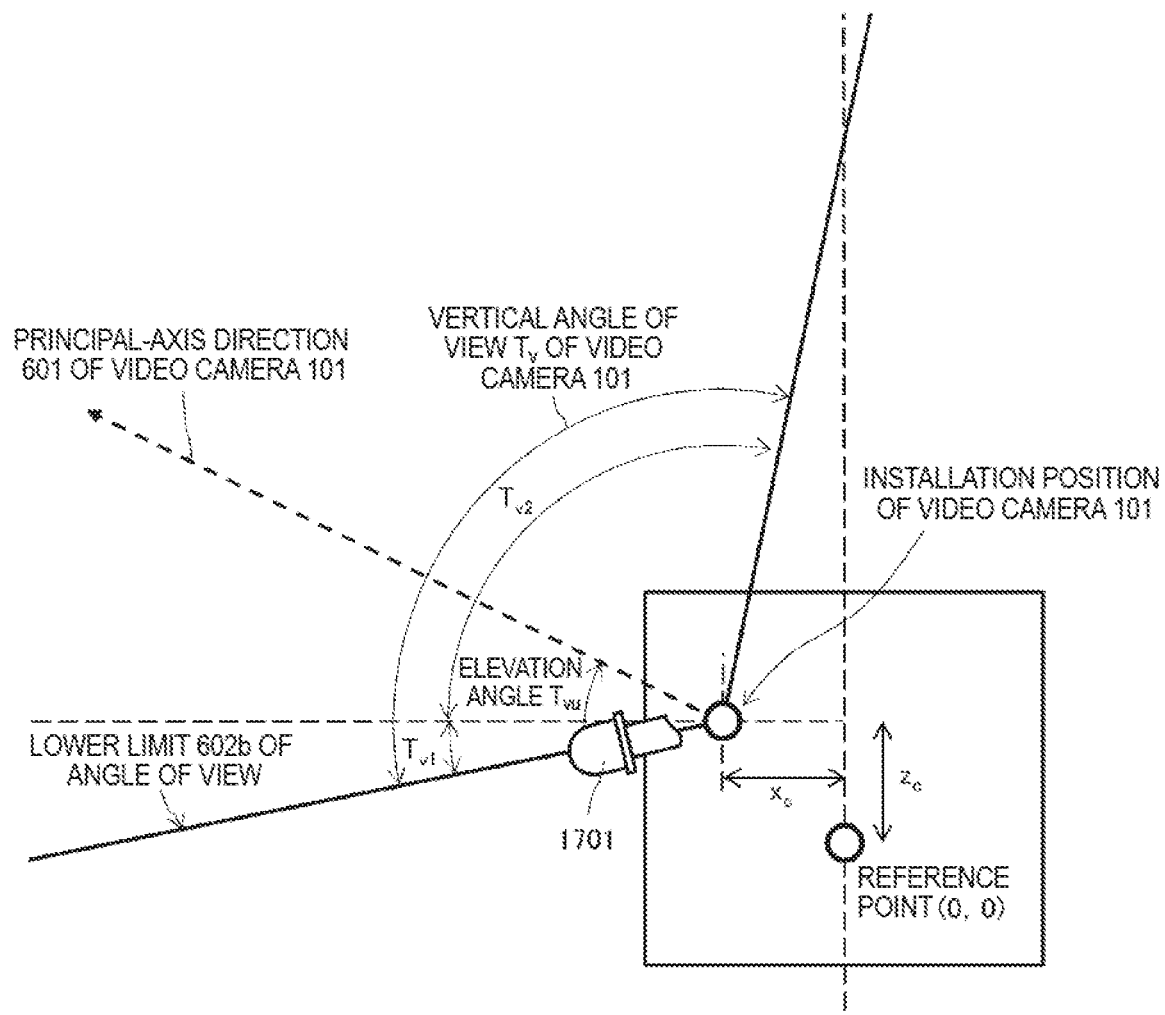
FIG. 18 illustrates the laser pointer 1701 having an optical axis thereof directed toward a lower limit 602b of a vertical angle of view 602 of the video camera 101.

FIG. 17 illustrates an example arrangement of a laser pointer 1701 as the blind spot presenting unit. The laser pointer 1701 is, as illustrated, disposed substantially in the middle between the adjacent video cameras 101 and 102. As illustrated in FIG. 18, an optical axis of the laser pointer 1701 is directed to the lower limit 602b of the vertical angle of view 602 of the video camera 101. The laser pointer then irradiates the border of a blind spot 1702 at which the lower limit of the vertical angle of view crosses the floor.

Although the laser pointer 1701 is illustrated only between the video cameras 101 and 102 in FIG. 17 for simplification, the laser pointers may be disposed between all adjacent video cameras.

The laser pointer 1701 may constantly be turned on while the multi-camera system 100 is installed or, alternatively, may only be turned on during photographing or during preparation for the photographing so as not to interrupt the captured images. The photographer may of course turn on and off of the laser pointer 1701 by hand.

As described above by referring to FIG. 8, the blind spot region 830 has been created ahead of the front limit point of the angle of view $Q_d$ between the horizontal angles of view 802 and 812 of the adjacent video cameras 101, 102.

When the photographer photographs the image of an object (e.g., an object placed on the floor) that is located at a position substantially in the middle between the principal-axis directions 801, 802 of the video cameras 101, 102, the photographer should pay enough attention to put the object in the image capturing angle of view (or exclude any part of the object from the blind spot 830). The multi-camera system 100 according to the present embodiment may include the laser pointer 1701 that irradiates the point $Q_d$ as needed to visually present the front limit of the angle of view.

As described above, the multi-camera system 100 according to the present embodiment is able to photograph the image of the entire surroundings (the half-celestial sphere) by using a smaller number of wide angle video cameras.

The multi-camera system 100 according to the present embodiment is able to decrease the parallax between adjacent images in joining the captured images captured by the video cameras.

The multi-camera system 100 according to the present embodiment is able to photograph the image in the overhead direction without using the video camera that is directed right above. As a result of this, an empty space is formed on the top board of the body and may be used for installing the external device. The external device to be installed may be a microphone array, a lighting appliance, a battery, a communication device, or a recording device. For example, the microphone array may be installed on the top board to allow sound collection in the vicinity of the viewpoint of the video cameras 101 to 106. This is advantageous in facilitating localization of the sound image.

CITATION LIST

Patent Literature

| | |
|---|---|
| Patent Literature 2: | JP 2010-258669A |
| Patent Literature 3: | JP 2012-204983A |
| Patent Literature 4: | JP 2013-31060A |

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

Although the embodiment of the multi-camera system including six video cameras has been mainly described in this specification, the technology disclosed in this specification is not limited to a specific number of cameras. If the number of cameras is not larger than five or not smaller than seven, the camera installation positions would be determined according to Formulas (1) and (4) above corresponding to the vertical angle of view and the horizontal angle of view of the cameras.

The technology disclosed in this specification may be used similarly in a multi-camera system that includes a plurality of still cameras instead of video cameras.

Essentially, the technology disclosed in this specification has been described by way of example, and the stated content of this specification should not be interpreted as being limiting. The spirit of the technology disclosed in this specification should be determined in consideration of the claims.

Additionally, the present technology may also be configured as below.

(1)
An image capturing apparatus including:
a plurality of cameras arranged radially, with a camera principal-axis direction of each camera directed upward from a horizontal plane by a predetermined elevation angle.

(1-2)
The image capturing apparatus according to (1), further including:
an image processor that joins captured image of the plurality of cameras according to respective installation positions.

(2)
The image capturing apparatus according to (1),
wherein the plurality of cameras are arranged at predetermined angular intervals on a horizontal concentric circle about a predetermined reference point.

(3)
The image capturing apparatus according to (1)1 or (2),
wherein the plurality of cameras are installed in such a manner that upper end portions of vertical angles of view of the respective cameras overlap each other.

(4)
The image capturing apparatus according to (3),
wherein a size of a blind spot under the upper overlapping portions of the vertical angles of view of the respective cameras is controlled based on a vertical angle of view $T_v$, an elevation angle $T_{vu}$ of the camera principal-axis direction, and a camera installation position of each of the plurality of cameras.

(5)
The image capturing apparatus according to any of (1) to (4),
wherein the plurality of cameras are installed in such a manner that right-and-left end portions of image capturing angles of view of cameras disposed adjacent to each other in a horizontal direction overlap each other.

(6)
The image capturing apparatus according to (5),
wherein a size of a blind spot between horizontal angles of view of adjacent cameras is controlled based on a horizontal angle of view $T_h$, an inclination angle $T_{hu}$ of the camera principal-axis direction, and a camera installation position of each of the plurality of cameras.

(7)
The image capturing apparatus according to any of (1) to (6), further including:
an external device installed in a blind spot region under respective upper overlapping end portions of the image capturing angles of view of the plurality of cameras.

(8)
The image capturing apparatus according to (7),
wherein the external device is at least one of a microphone array, a lighting appliance, a battery, a communication apparatus, and a recording apparatus.

(9)
The image capturing apparatus according to any of (1) to (8), further including:
a blind spot presenting unit that presents a blind spot under a lower limit of a vertical angle of view of at least one of the plurality of cameras.

(10)
The image capturing apparatus according to any of (1) to (9), further including:
a blind spot presenting unit that presents a blind spot ahead of front limits of horizontal angles of view of at least two adjacent cameras among the plurality of cameras.

(11)
The image capturing apparatus according to any of (1) to (10),
wherein the plurality of cameras are arranged in such a manner that pixels having the same (or near) exposure readout time are arranged adjacent to each other in image capturing devices of adjacent cameras.

(12)
The image capturing apparatus according to any of (1) to (10),
wherein the plurality of cameras use image capturing devices of a line-exposure successive readout system, and
the plurality of cameras are arranged in such a manner that readout directions of image capturing devices of adjacent cameras are opposite to each other and face each other.

(13)
The image capturing apparatus according to any of (1) to (10),
wherein the plurality of cameras use image capturing devices of a line-exposure successive readout system, and
cameras rotated clockwise by 90 degrees and cameras rotated anti-clockwise by 90 degrees are arranged alternately.

REFERENCE SIGNS LIST

100 multi-camera system
101 to 106 video camera
110 image processor
120 display unit
301 top board
1900 external device

The invention claimed is:

1. An image capturing apparatus comprising:
a plurality of cameras arranged radially, with a camera principal-axis direction of each camera directed upward from a horizontal plane by a predetermined elevation angle,
in which the camera-principal axis directions do not intersect one another,
in which each camera of the plurality of cameras comprises a rolling shutter system in which pixels are read out of an image sensor on a line-by-line basis, and
in which the plurality of cameras are arranged in such a manner that, for each pair of adjacent cameras, when respective images are read out of respective image sensors of the pair, two lines from respective ones of the image sensors that are closest to each other, from among pairs of lines formed by one line of one of the image sensors and one line of the other image sensor, are read out of the image sensors at the same time or at substantially the same time regardless of the orientation of the image capturing apparatus; and
at least one of (i) a light emission producer that emits light to visually mark an area of the image capturing apparatus so as to indicate a limit of a blind spot region which exists under a lower limit of a vertical angle of view of at least one of the plurality of cameras or (ii) a light emission producer that emits light to visually mark an area of the image capturing apparatus so as to indicate a limit of a blind spot region which exists ahead of front limits of horizontal angles of view of at least two adjacent cameras among the plurality of cameras, whereby the at least one of (i) or (ii) are operable to provide a user of the image capturing apparatus with guidance regarding a relationship between a blind spot region and a position of an object to be imaged by the apparatus.

2. The image capturing apparatus according to claim 1, wherein the plurality of cameras are arranged at predetermined angular intervals on a horizontal concentric circle about a predetermined reference point.

3. The image capturing apparatus according to claim 1, wherein the plurality of cameras are installed in such a manner that upper end portions of vertical angles of view of the respective cameras overlap each other.

4. The image capturing apparatus according to claim 3, wherein a size of the blind spot under the lower limit of the vertical angle of view of the at least one of the plurality of cameras is controlled based on a vertical angle of view $T_v$, an elevation angle $T_{vu}$ of the camera principal-axis direction, and a camera installation position of each of the plurality of cameras.

5. The image capturing apparatus according to claim 1, wherein the plurality of cameras are installed in such a manner that right-and-left end portions of image capturing angles of view of cameras disposed adjacent to each other in a horizontal direction overlap each other.

6. The image capturing apparatus according to claim 5, wherein a size of the blind spot ahead of front limits of horizontal angles of view of the at least two adjacent cameras among the plurality of cameras is controlled based on a horizontal angle of view $T_h$, an inclination angle $T_{hu}$ of the camera principal-axis direction, and a camera installation position of each of the plurality of cameras.

7. The image capturing apparatus according to claim 1, further comprising:
an external device installed in the blind spot under the lower limit of the vertical angle of view of the at least one of the plurality of cameras.

8. The image capturing apparatus according to claim 7, wherein the external device is at least one of a microphone array, a lighting appliance, a battery, a communication apparatus, and a recording apparatus.

9. The image capturing apparatus according to claim 1, wherein in a radial arrangement of the plurality of cameras arranged radially, cameras having image capturing devices rotated clockwise by 90 degrees and cameras having image capturing devices rotated anti-clockwise by 90 degrees are arranged alternately.

* * * * *